(12) United States Patent
Ott

(10) Patent No.: US 8,702,320 B2
(45) Date of Patent: Apr. 22, 2014

(54) FIBER OPTIC FERRULE ASSEMBLY WITH TRANSITIONING INSERT

(75) Inventor: Michael James Ott, Le Sueur, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 470 days.

(21) Appl. No.: 12/915,692

(22) Filed: Oct. 29, 2010

(65) Prior Publication Data

US 2011/0103748 A1 May 5, 2011

Related U.S. Application Data

(60) Provisional application No. 61/258,010, filed on Nov. 4, 2009.

(51) Int. Cl.
*G02B 6/36* (2006.01)

(52) U.S. Cl.
USPC ............................................................. 385/78

(58) Field of Classification Search
None
See application file for complete search history.

(56) References Cited

U.S. PATENT DOCUMENTS

| | | | |
|---|---|---|---|
| 3,825,320 A | 7/1974 | Redfern | |
| 4,705,352 A | 11/1987 | Margolin et al. | |
| 4,718,745 A | 1/1988 | Strait, Jr. | |
| 4,931,120 A | 6/1990 | Christoff | |
| 5,185,838 A | 2/1993 | Lüottgert et al. | |
| 5,216,734 A | 6/1993 | Grinderslev | |
| 5,241,613 A | 8/1993 | Li et al. | |
| 5,381,500 A | 1/1995 | Edwards et al. | |
| 5,390,270 A | 2/1995 | Hanzawa et al. | |
| 5,394,496 A | 2/1995 | Caldwell et al. | |
| 5,394,497 A | 2/1995 | Erdman et al. | |
| 5,615,291 A | 3/1997 | Hayakawa et al. | |
| 5,720,907 A | 2/1998 | Anderson et al. | |
| 5,751,875 A | 5/1998 | Edwards et al. | |
| 5,768,455 A | 6/1998 | Konik | |

(Continued)

FOREIGN PATENT DOCUMENTS

| | | |
|---|---|---|
| EP | 0 072 773 A2 | 2/1983 |
| FR | 2 612 302 A1 | 9/1988 |

(Continued)

OTHER PUBLICATIONS

International Search Report and Written Opinion mailed Dec. 20, 2010.

*Primary Examiner* — Tina Wong
(74) *Attorney, Agent, or Firm* — Merchant & Gould P.C.

(57) ABSTRACT

A fiber optic ferrule assembly includes a ferrule with an axial passage, an insert with an axial passage, and a hub with an axial passage. The axial passage of the ferrule includes a first diameter portion having a diameter of at least 125 microns, and the axial passage of the insert includes a second diameter portion having a diameter of at least 250 microns. The axial passage of the hub holds at least a portion of the ferrule and the insert. The fiber optic ferrule assembly terminates a fiber optic cable including an inner fiber, an outer coating around the inner fiber, and a buffer layer around the outer coating. The first diameter portion only receives the inner fiber and no outer coating, and the second diameter portion receives at least a portion of an exposed portion of the outer coating and no buffer layer. Minimal epoxy is applied around a transition area near an end of the outer coating. A method of assembling a terminated fiber optic cable is also provided.

29 Claims, 9 Drawing Sheets

(56) References Cited

U.S. PATENT DOCUMENTS

| | | | |
|---|---|---|---|
| 5,778,126 A | 7/1998 | Saitoh | |
| 5,862,280 A | 1/1999 | Tanaka et al. | |
| 5,883,995 A | 3/1999 | Lu | |
| 5,923,804 A | 7/1999 | Rosson | |
| 5,989,106 A | 11/1999 | Tanaka et al. | |
| 6,022,150 A | 2/2000 | Erdman et al. | |
| 6,283,643 B1 | 9/2001 | Serizawa | |
| 6,357,933 B1 * | 3/2002 | Bradley et al. | 385/81 |
| 6,425,696 B1 * | 7/2002 | Peterson et al. | 385/92 |
| 6,648,521 B2 | 11/2003 | Roehrs et al. | |
| 6,722,790 B2 | 4/2004 | Caveney | |
| 6,799,901 B2 * | 10/2004 | Yoshimura et al. | 385/88 |
| 6,869,228 B2 | 3/2005 | Ishii et al. | |
| 6,877,910 B2 | 4/2005 | Takahashi et al. | |
| 6,883,976 B2 * | 4/2005 | Sato | 385/78 |
| 7,121,733 B2 | 10/2006 | Hengelmolen et al. | |
| 7,147,384 B2 | 12/2006 | Hardcastle et al. | |
| 7,201,518 B2 | 4/2007 | Holmquist | |
| 7,270,487 B2 | 9/2007 | Billman et al. | |
| 7,281,859 B2 | 10/2007 | Mudd et al. | |
| 7,341,383 B2 | 3/2008 | Droege et al. | |
| 7,435,012 B1 | 10/2008 | Beldycki | |
| 2002/0067894 A1 | 6/2002 | Scanzillo | |
| 2002/0186934 A1 | 12/2002 | Hug et al. | |
| 2003/0215191 A1 * | 11/2003 | Taira et al. | 385/78 |
| 2006/0269192 A1 | 11/2006 | Hayasaka | |
| 2008/0031573 A1 | 2/2008 | Droege et al. | |

FOREIGN PATENT DOCUMENTS

| | | |
|---|---|---|
| JP | 61-221712 | 10/1986 |
| JP | 7-168054 | 7/1995 |
| JP | 2003-66273 | 3/2003 |
| JP | 2008-76629 | 4/2008 |
| JP | 2010-78695 | 4/2010 |

* cited by examiner

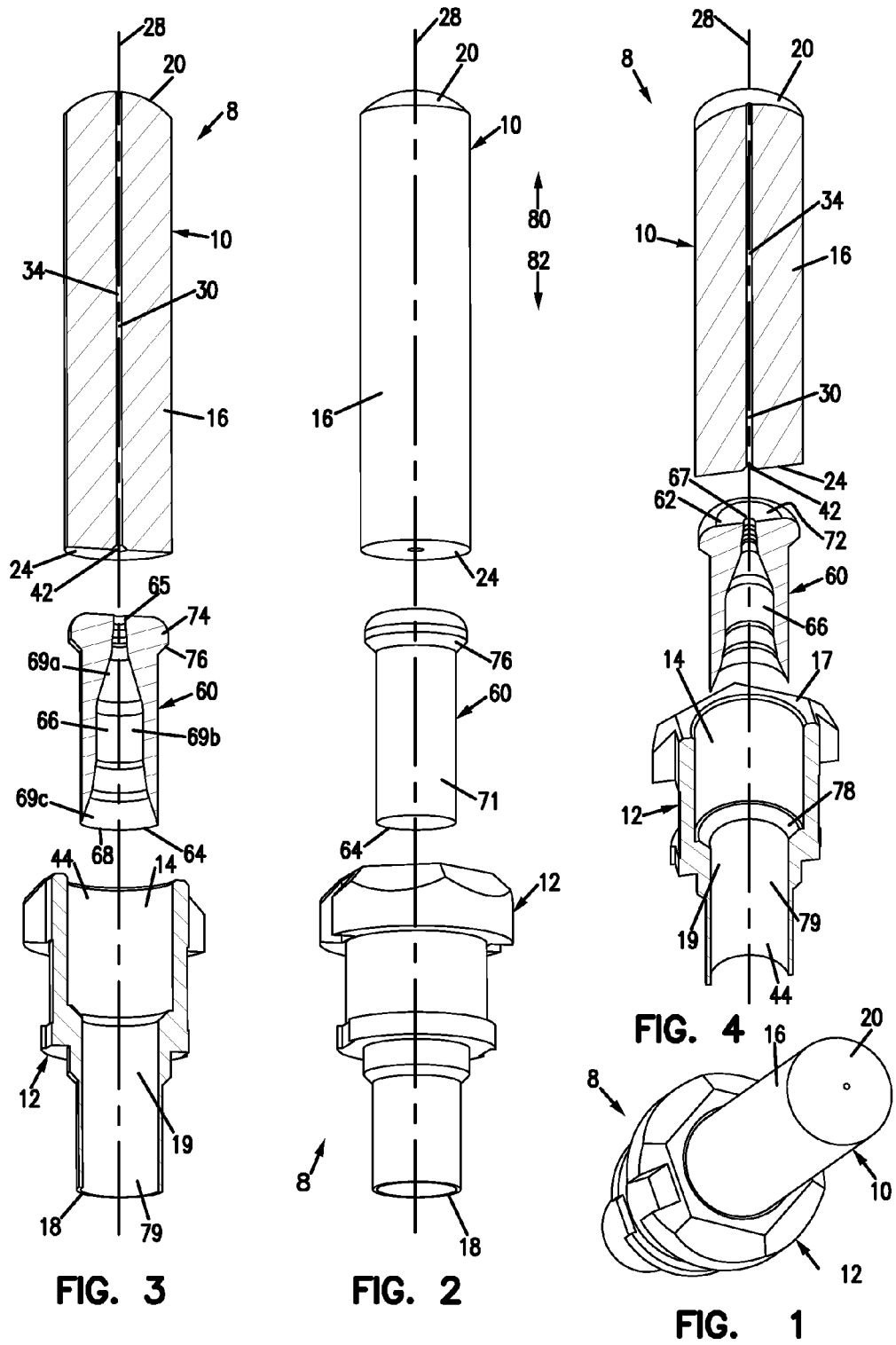

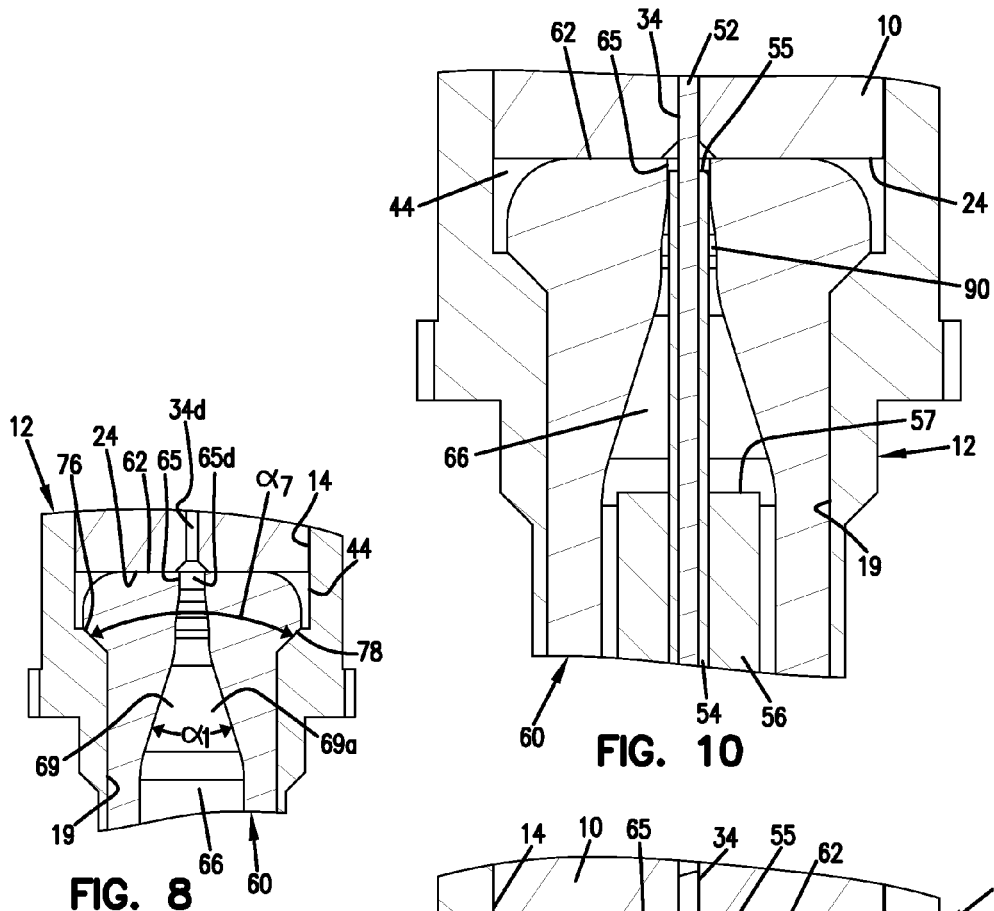
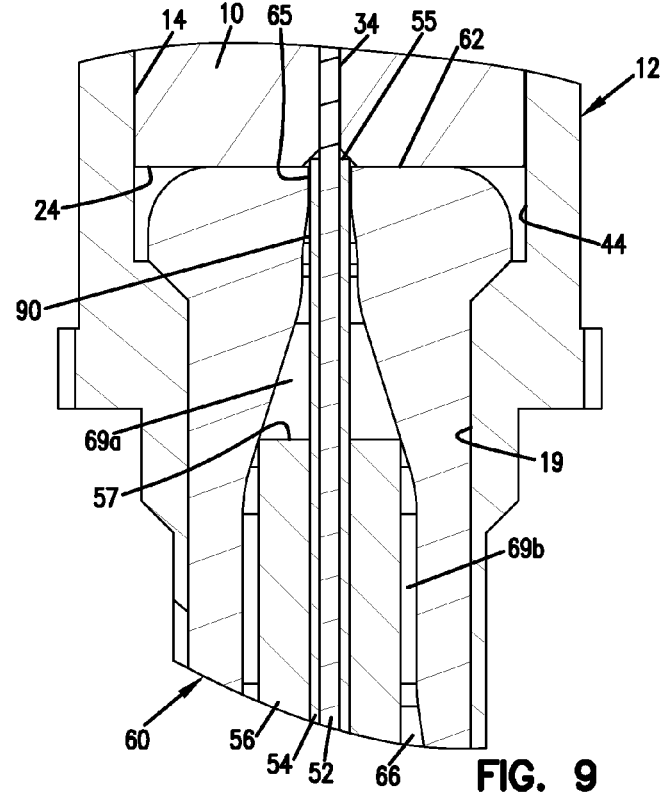
FIG. 8
FIG. 9
FIG. 10

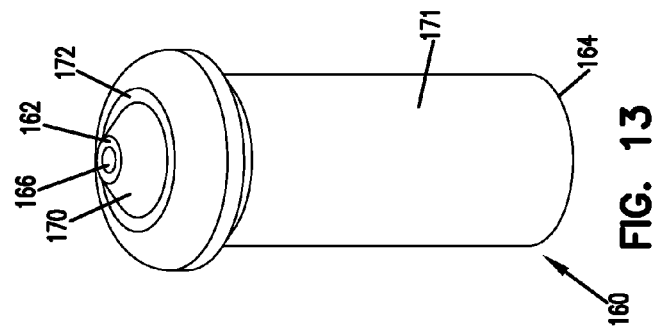
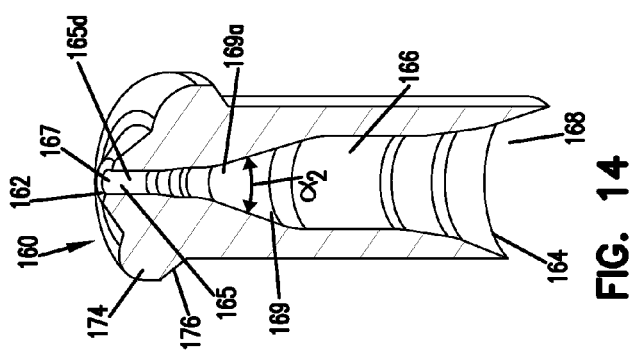
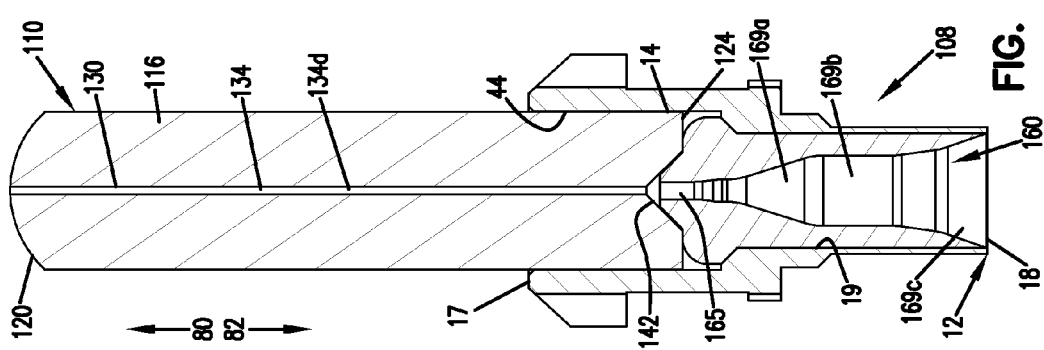
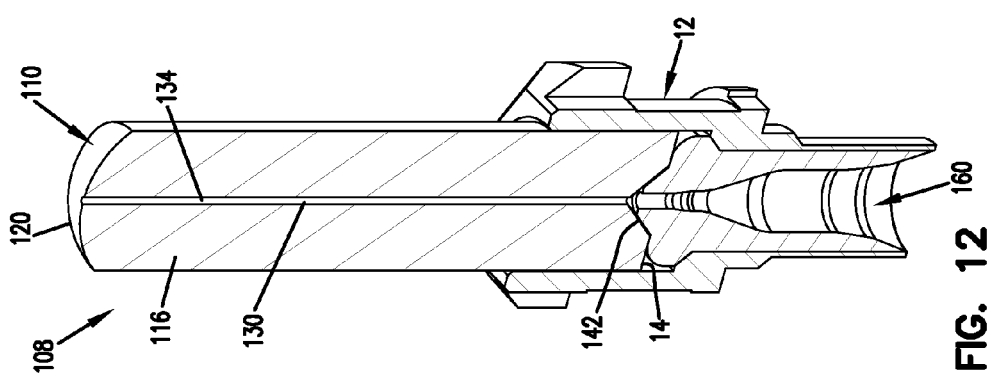

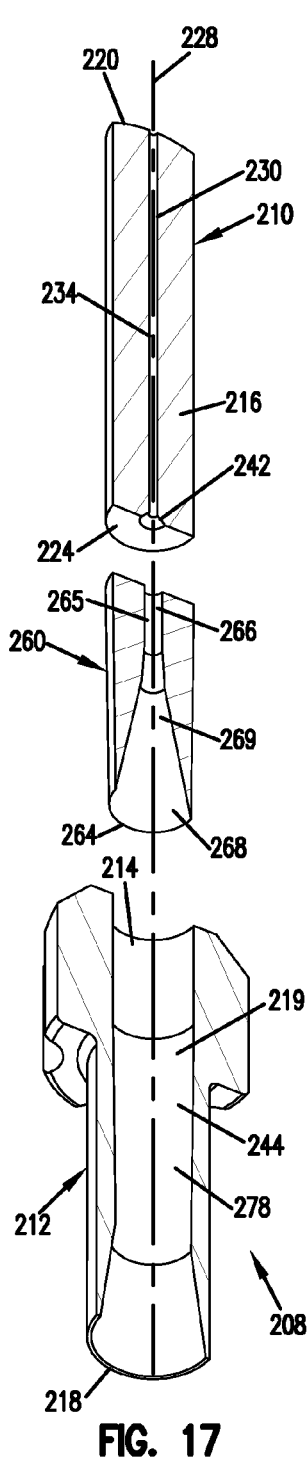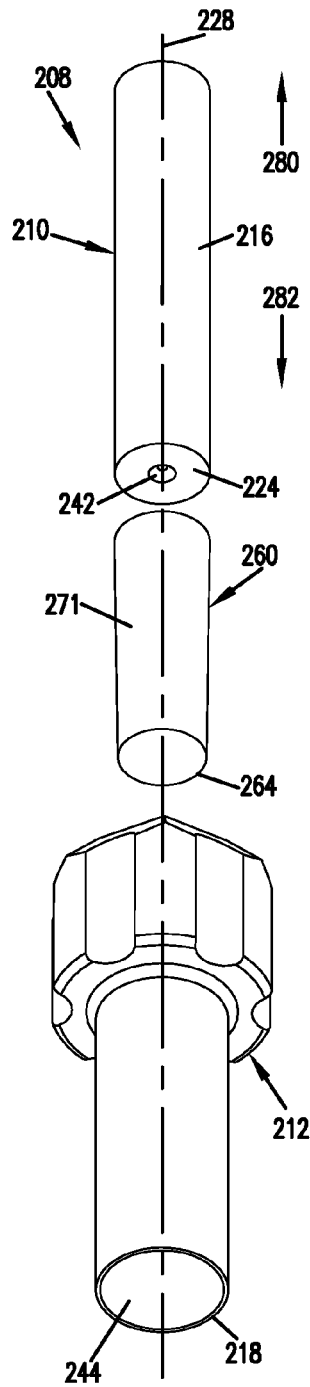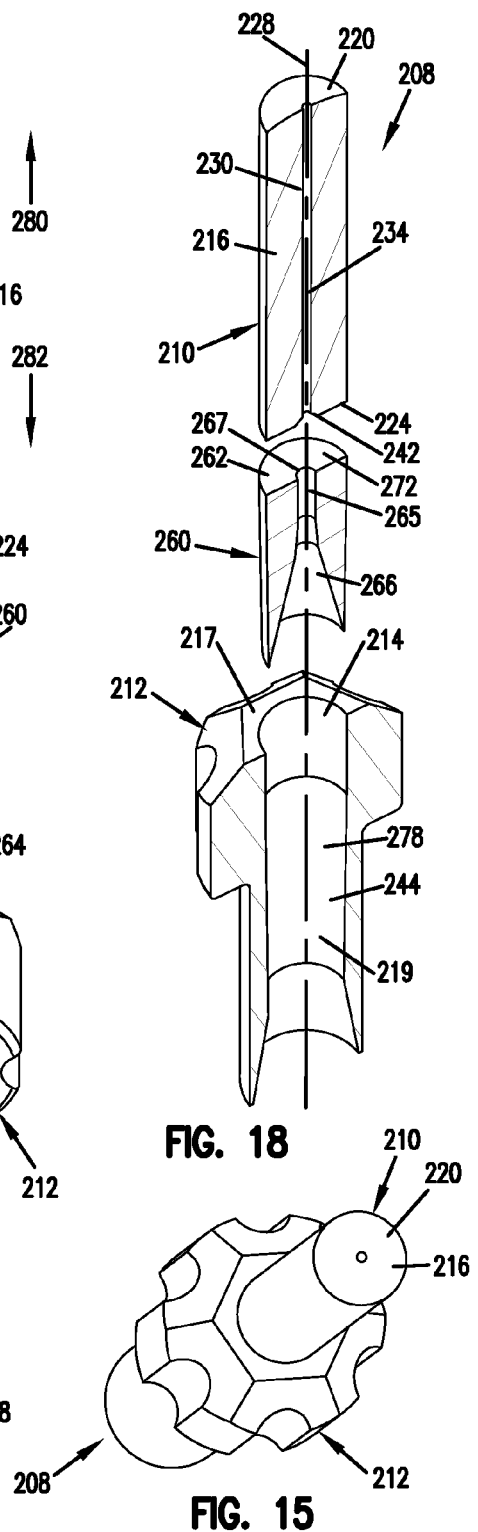
FIG. 17
FIG. 16
FIG. 18
FIG. 15

FIBER OPTIC FERRULE ASSEMBLY WITH TRANSITIONING INSERT

CROSS REFERENCE TO RELATED APPLICATION

The present application claims the benefit of U.S. Provisional Patent Application Ser. No. 61/258,010, filed Nov. 4, 2009, which is hereby incorporated by reference in its entirety.

FIELD OF THE INVENTION

The present invention relates to terminating ends of fiber optic cables with ferrules.

BACKGROUND OF THE INVENTION

Typically an end of a fiber optic cable is terminated by a fiber optic connector by gluing a fiber, within the fiber optic cable, to a ferrule of the fiber optic connector. A well known fiber optic cable size includes an inner glass fiber of 125 microns in diameter, with an outer coating of 250 microns in diameter, covered by a polymeric buffer layer of 900 microns in diameter.

One problem with terminating fiber optic cables can include fiber breakage at a rear interface area between an end of the glass fiber and the ferrule. In this interface area is the epoxy used to glue the fiber to the ferrule. Such breakage tends to increase in response to greater temperature fluctuations during use of the cables. Differences in thermal expansion are believed to cause the breakage. There is a need to improve the interface between fiber optic cables and connectors to reduce fiber breakage, especially due to thermal stress.

SUMMARY OF THE INVENTION

A fiber optic ferrule includes a body extending from a first end to a second opposite end, with the body including an axial passage extending between the first and second ends. An insert includes a body extending from a first end to a second opposite end, with the body including an axial passage extending between the first and second ends. The first end of the insert abuts the fiber optic ferrule. The insert and a portion of the fiber optic ferrule are mounted within an axial passage of a hub.

In one preferred embodiment, the axial passage of the fiber optic ferrule includes a diametric portion having a diameter of at least 125 microns and a funnel shape at the second end extending inward from the second end to the diametric portion. The axial passage of the insert includes a diametric portion having a diameter of at least 250 microns and can include a funnel shape at the second end extending inward from the second end to the diametric portion.

A method of assembling a ferrule terminated fiber optic cable includes providing a ferrule, a hub, and an insert and inserting the insert and a portion of the ferrule into an axial passage of the hub. An end of the ferrule is inserted into the axial passage of the hub. An axial passage of the ferrule includes a tapered shape adjacent the end of the ferrule tapering down to a first inner diameter. The method includes providing a cable with an inner fiber, an outer coating around the inner fiber, and a buffer layer around the outer coating. The method includes stripping a stripped portion of the buffer layer from an end of the cable to expose an exposed portion of the outer coating and create a new end of the buffer layer, stripping a stripped portion of the exposed portion of the outer coating from the end of the cable to expose an exposed portion of the inner fiber with a remaining exposed portion of the outer coating remaining on the cable. The method further includes inserting the exposed portion of the inner fiber into the axial passage of the ferrule and the remaining exposed portion of the outer coating into an axial passage of the insert with the axial passage of the ferrule having the first inner diameter and the axial passage of the insert having a second inner diameter. The first inner diameter only receives the inner fiber and no outer coating. The second inner diameter receives at least a portion of the remaining exposed portion of the outer coating and no buffer layer. The new end of the buffer layer is positioned in the axial passage of the hub. The method can further include adhesively holding the inner fiber to the ferrule.

One preferred method includes providing the cable with the inner fiber at 125 microns, the outer coating at 250 microns around the inner fiber, and the buffer layer at 900 microns around the outer coating. The first inner diameter of the axial passage of the ferrule is at least 125 microns, and the second inner diameter of the axial passage of the insert is at least 250 microns.

The present invention also relates to a device and a method for mounting a fiber to a ferrule wherein the ferrule includes a first passageway portion sized only to receive a bare fiber without a coating or a buffer layer, and a hub insert includes a second passageway portion sized to receive the fiber including the coating, but no buffer layer.

BRIEF DESCRIPTION OF THE DRAWINGS

FIG. 1 is a perspective view of a first example embodiment of a ferrule, an insert, and a hub in accordance with the principles of the present disclosure, a distal end of the ferrule showing;

FIG. 2 is an exploded perspective view of the ferrule, the insert, and the hub of FIG. 1 with a proximal end of each showing;

FIG. 3 is the exploded perspective view of FIG. 2 but shown in cross-section;

FIG. 4 is an exploded cross-sectional perspective view of the ferrule, the insert, and the hub of FIG. 1 with the distal end of the ferrule and distal ends of the insert and the hub showing;

FIG. 8 is an enlarged portion of FIG. 5;

FIG. 9 is an enlarged portion of FIG. 6;

FIG. 10 is an enlarged portion of FIG. 7;

FIG. 11 is a cross-sectional side view of a second example embodiment of a ferrule and an insert with the hub of FIG. 1 in accordance with the principles of the present disclosure;

FIG. 12 is a cross-sectional perspective view of the ferrule and the insert of FIG. 11 and the hub of FIG. 1 with the distal end of each showing;

FIG. 13 is a perspective view of the insert of FIG. 11 with the distal end showing;

FIG. 14 is the perspective view of FIG. 13 but shown in cross-section;

FIG. 15 is a perspective view of a third example embodiment of a ferrule, an insert, and a hub in accordance with the principles of the present disclosure, a distal end of the ferrule showing;

FIG. 16 is an exploded perspective view of the ferrule, the insert, and the hub of FIG. 15 with a proximal end of each showing;

FIG. 17 is the exploded perspective view of FIG. 16 but shown in cross-section;

FIG. 18 is an exploded cross-sectional perspective view of the ferrule, the insert, and the hub of FIG. 15 with the distal end of the ferrule and distal ends of the insert and the hub showing;

DETAILED DESCRIPTION

Figure 5:
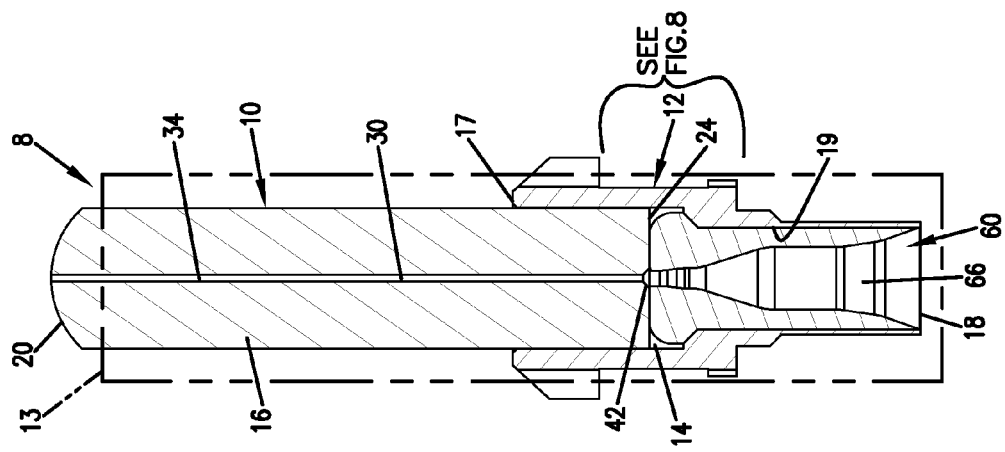
FIG. 5 is a cross-sectional side view of the ferrule, the insert, and the hub of FIG. 1.

Referring now to FIGS. 1-10, a first embodiment of a fiber optic ferrule assembly 8 is illustrated. The ferrule assembly 8 includes a fiber optic ferrule 10 and an insert 60 mounted to a hub 12. Generally, the ferrule 10 and the insert 60 and the hub 12 are secured together by convenient methods including press fit or adhesive mounts. The ferrule 10, the insert 60, and the hub 12 are mounted within a connector housing 13 shown in dashed lines at FIG. 5. The connector housing 13 can be one of a variety of well known connector types, including SC, FC, ST, LX.5, LC, and others. As will be described below, the ferrule 10, the insert 60, and the hub 12 are connected to an end of a fiber optic cable 50 for use in connectorizing the end of the cable 50 (see FIGS. 6 and 7).

The ferrule 10 includes a body 16 with a first end 20 defining a ferrule tip. A distal direction 80 is defined in a direction toward the ferrule tip from other portions of the fiber optic ferrule assembly 8, and a proximal direction 82 is defined in an opposite direction (see FIG. 2). The body 16 of the ferrule 10 includes an opposite end 24 received in a ferrule mounting surface 14 of the hub 12. In the depicted embodiment, the ferrule mounting surface 14 has a form of a pocket. The ferrule 10 includes a central axis 28 illustrated at FIGS. 2-4. The first end 20 of the ferrule 10 is typically polished along with an end 53 of an optical fiber 52 of the fiber optic cable 50 after the fiber 52 is installed. The body 16 of the ferrule 10 is typically ceramic in construction.

The ferrule 10 includes a central passage 30 concentric with the axis 28. The central passage 30 extends from the first end 20 to the opposite end 24 of the ferrule 10. The central passage 30 includes a substantially cylindrical first portion 34 having a first diameter and a rear or a second portion 42. The first portion 34 is sized to receive the fiber 52, sized at 125 microns. The second portion 42 is tapered inward from the opposite end 24 so as to facilitate insertion of the fiber 52 during installation.

The insert 60 includes a central passage 66, also concentric with the axis 28. The central passage 66 extends from a first end 62 to an opposite end 64 of the insert 60. A first opening 67 is defined where the central passage 66 exits the first end 62, and a second opening 68 is defined where the central passage 66 exits the second end 64. The central passage 66 includes a substantially cylindrical first portion 65 having a second diameter and a second portion 69 (see FIG. 8). The first portion 65 of the insert 60 is sized to receive the fiber 52 including an outer coating 54, sized at 250 microns. The second portion 69 is tapered inward (i.e., funnel shaped) from the opposite end 64 so as to facilitate insertion of the bare fiber 52 and the fiber 52 including the outer coating 54 during installation. The second portion 69 can include a tapered portion 69a that is smoothly transitioned from the first portion 65 (see FIG. 3). The tapered portion 69a can define an angle $\alpha_1$ that is in a range of about 32 degrees to about 38 degrees (see FIG. 8). The second portion 69 can include a cylindrical portion 69b that is smoothly transitioned from the tapered portion 69a. The cylindrical portion 69b can be sized to receive the buffer layer 56 at 900 microns (see FIGS. 9 and 10). The second portion 69 can include a tapered portion 69c that is smoothly transitioned from the cylindrical portion 69b. The tapered portion 69c can define a sharp edge at the second end 64 of the insert 60. The second portion 69 can further include additional tapers, cylindrical portions, rounded portions, and other transitioning features as illustrated. The insert 60 includes a shoulder 72 at the first end 62. A flange 74 extends between the shoulder 72 and a tapered shoulder 76. A substantially cylindrical surface 71 extends between the tapered shoulder 76 and the end 64 of the insert 60. The insert 60 is typically polymeric in construction.

Figure 29:
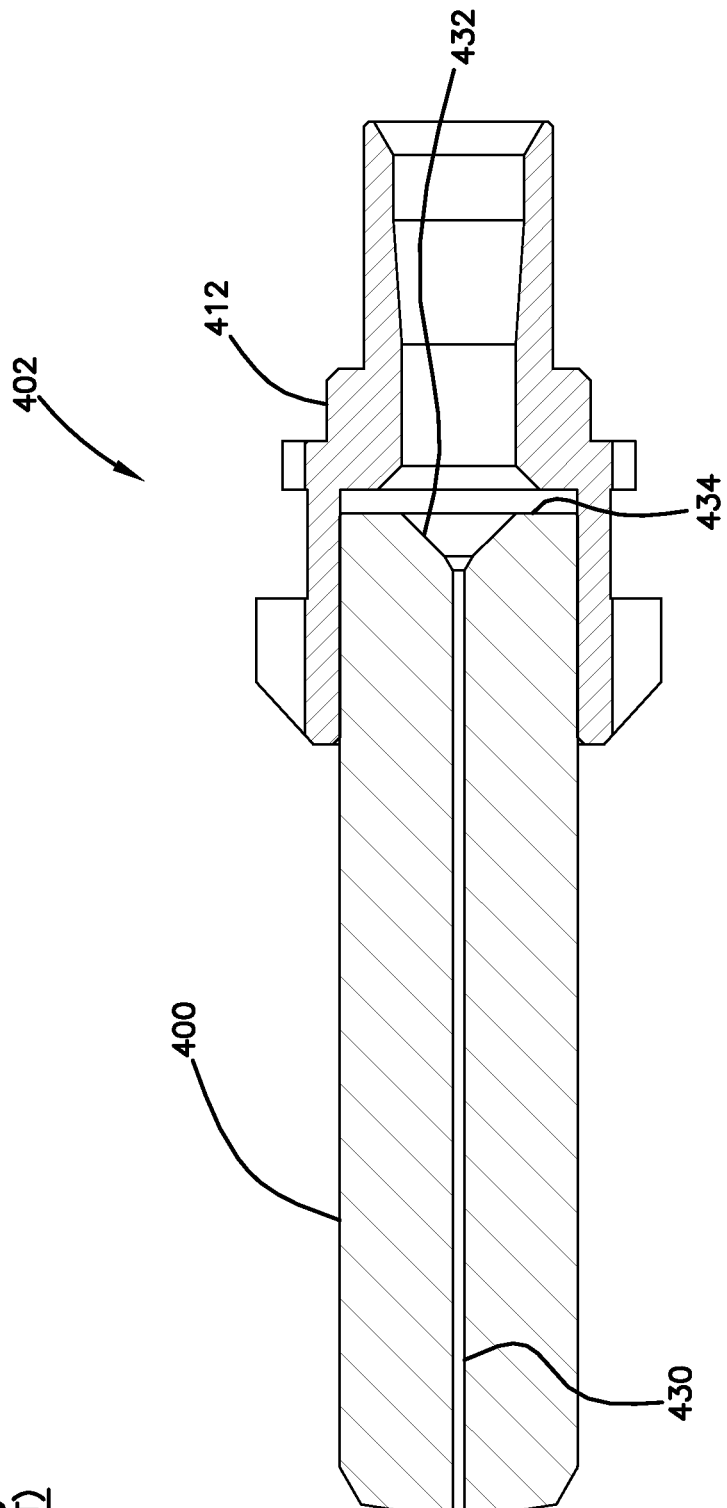
FIG. 29 is a cross-sectional side view of a prior art ferrule and hub.

A prior art ferrule assembly 402 including a ferrule 400 mounted in a hub 412 is shown at FIG. 29. In prior art ferrule assemblies, such as the ferrule assembly 402, inserts with characteristics of the insert 60 were not provided. In particular, the ferrule 400 of the ferrule assembly 402 includes a central passage 430 having a uniform diameter sized for receipt of the fiber 52 at 125 microns. A tapered portion 432 extends from an end 434 to the central passage 430.

In contrast, the ferrule assembly 8 includes the insert 60 with transitioning features including the cylindrical portion 65 and the funnel portion 69.

Referring now to FIGS. 6-10, the fiber optic cable 50 is shown with the inner fiber 52, the outer coating 54, and the buffer layer 56. The fiber 52 terminates at the end 53. Typically, the end 53 is removed and polished with the end 20 of the ferrule 10. The coating 54 terminates at an end 55. The buffer layer 56 terminates at an end 57. As shown, a portion of the coating 54 extends beyond the end 57 of the buffer layer 56, and a portion of the fiber 52 extends beyond the end 55 of the coating 54.

With special reference to FIGS. 9 and 10, the cylindrical portion 34 of the ferrule 10 closely surrounds the fiber 52, and the cylindrical portion 65 of the insert 60 closely surrounds the coating 54. Epoxy 90 or other bonding material can be used within the central passage 30 to adhesively hold the fiber 52 of the cable 50 to the ferrule 10. In addition, the epoxy 90 can be used within the central passage 66 to adhesively hold the coating 54 of the fiber 52 of the cable 50 to the insert 60, and the epoxy 90 can be used within a central passage 44 of the hub 12 and/or the central passage 66 of the insert 60 to adhesively hold the buffer layer 56 of the cable 50 to the hub 12 and/or the insert 60. However, very little epoxy 90 is positioned around the end 55 of the coating 54. By reducing a volume of the epoxy 90 positioned around the end 55 of the coating 54, less thermally induced stresses are applied to the fiber 52. As shown, the second portion 42 of the passage 30 of the ferrule 10 defines a small conically shaped pocket around or near the end 55 of the coating 54. The pocket is a transition area between the bare fiber 52 and the fiber 52 including the outer coating 54. By allowing the coating 54 to extend past the end 57 of the buffer layer 56, and then be received in the pocket of the second portion 42 of the passage 30 of the ferrule 10, a smaller amount of the epoxy 90 is in contact with the fiber 52 adjacent the end 55 of the coating 54. Less epoxy 90 around the interface between the coating 54 and the fiber 52 will reduce the thermal effects caused by any differences in thermal expansion between the fiber 52 and the epoxy 90.

Figure 6:
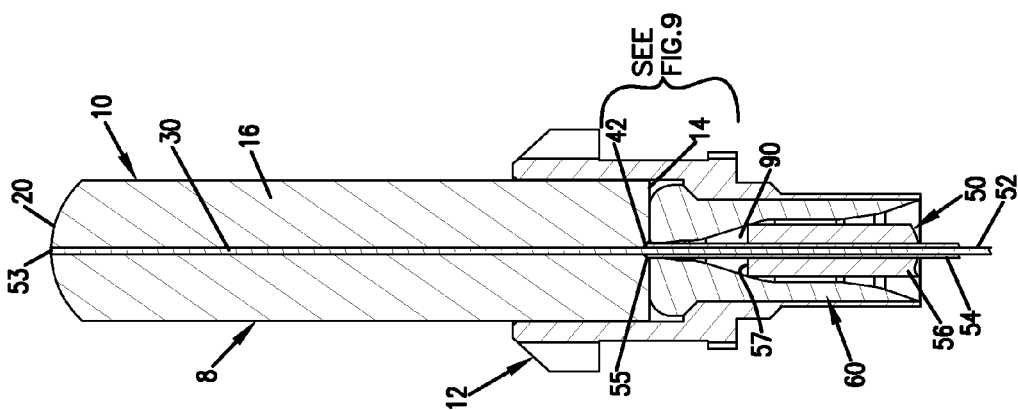
FIG. 6 is the cross-sectional side view of FIG. 5 with a fiber optic cable inserted and a fiber coating layer of the fiber optic cable inserted into the ferrule.
Figure 7:
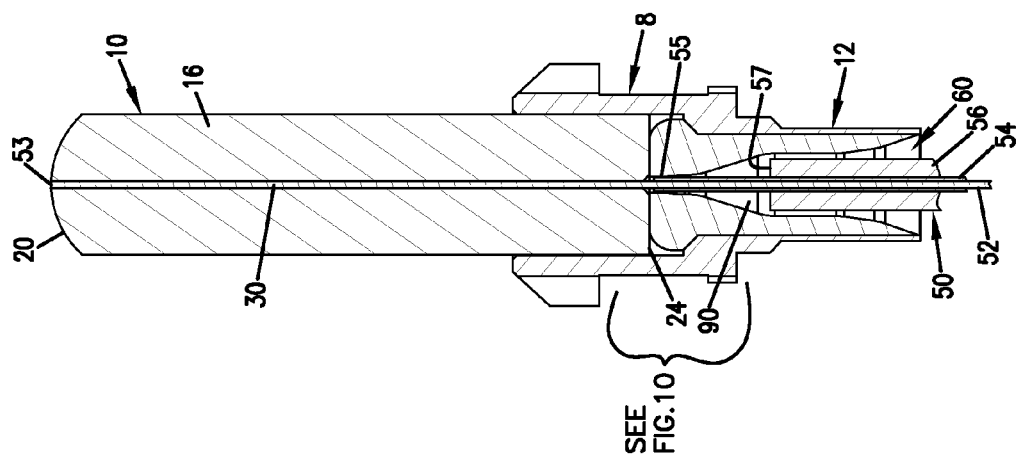
FIG. 7 is the cross-sectional side view of FIG. 5 with the fiber optic cable of FIG. 6 inserted but the fiber coating layer of FIG. 6 not inserted into the ferrule.

The coating 54 does not need to be fully inserted into the pocket of the second portion 42 of the passage 30 of the ferrule 10, as shown at FIGS. 6 and 9. As shown at FIGS. 7 and 10, the second portion 42 of the passage 30 of the ferrule 10 is spaced from the end 55 of the coating 54. Such an arrangement still provides less epoxy 90 around the fiber 52, than in the arrangement of FIG. 29. One example epoxy is F123 from Tra-con, Inc. of Bedford, Mass.

In the ferrule 10, the first portion 34 has a dimension sized large enough to receive the uncoated fiber 52, but not so large as to receive the coated fiber (i.e., the fiber 52 including the coating 54). In the insert 60, the first portion 65 has a dimension sized large enough to receive the coated fiber (i.e., the fiber 52 including the coating 54), but not so large as to receive the buffer layer 56.

In the illustrated embodiment, the first portion 34 of the passage 30 of the ferrule 10 is cylindrically shaped and sized at 0.1255 mm +/31 0.0015/0.0000 mm to receive the inner fiber 52 sized at 125 microns. The first portion 65 of the central passage 66 of the insert 60 can be cylindrically shaped and sized at 0.260 mm +/–0.010 mm to receive the portion of the cable 50 including the outer coating 54 at 250 microns. A preferred range for the first portion 65 is greater than or equal to 250 microns and less than or equal to 500 microns. A more preferred range for the first portion 65 is greater than or equal to 250 microns and less than or equal to 300 microns. In the illustrated embodiment, the ferrule 10 is 10.5 mm long.

The insert 60 is preferably inserted into the passage 44 of the hub 12 prior to the ferrule 10. In particular, the cylindrical surface 71 of the insert 60 is inserted into an insert retaining surface 19 of the hub 12 until the tapered shoulder 76 of the flange 74 seats against a tapered seat 78 within the passage 44 of the hub 12. The tapered seat 78 and/or the tapered shoulder 76 can define an angle $\alpha_7$ in a range of about 85 degrees to about 95 degrees (see FIG. 8). The insert retaining surface 19 can include an internal cylindrical surface 79 and/or the tapered seat 78. Upon the insert 60 being mounted in the hub 12, the ferrule 10 can be inserted into the ferrule mounting surface 14 of the hub 12 until the shoulder 72 of the insert 60 abuts the end 24 of the ferrule 10. The insert 60 and the ferrule 10 can be placed within the passage 44 of the hub 12 together.

Friction can be used to hold the insert 60 within the hub 12. This friction can be generated by press fitting the insert 60 into the hub 12.

Referring now to FIGS. 11-14, a second embodiment of a fiber optic ferrule assembly 108 is illustrated. The ferrule assembly 108 includes a fiber optic ferrule 110 and an insert 160 mounted to the hub 12. The fiber optic ferrule assembly 108 includes similarities to the fiber optic ferrule assembly 8, described above. In particular, the ferrule 110 and the insert 160 and the hub 12 are secured together by convenient methods including press fit or adhesive mounts. The ferrule 110, the insert 160, and the hub 12 are typically mounted within a connector housing, such as the connector housing 13 shown in dashed lines at FIG. 5 and described above. Similar to the ferrule assembly 8, described above, the ferrule 110, the insert 160, and the hub 12 are connected to the end of the fiber optic cable 50 for use in connectorizing the end of the cable 50, similar to the first embodiment of FIGS. 6 and 7.

The ferrule 110 includes a body 116 with a first end 120 defining a ferrule tip. The body 116 of the ferrule 110 includes an opposite end 124 received in the ferrule mounting surface 14 of the hub 12. The first end 120 of the ferrule 110 is typically polished along with the end 53 of the optical fiber 52 of the fiber optic cable 50 after the fiber 52 is installed. The body 116 of the ferrule 110 is typically ceramic in construction.

The ferrule 110 includes a central passage 130 that extends from the first end 120 to the opposite end 124 of the ferrule 110. The central passage 130 includes a substantially cylindrical first portion 134 having a first diameter and a rear or a second portion 142. The first portion 134 is sized to receive the fiber 52, sized at 125 microns. The second portion 142 is tapered inward from the opposite end 124 so as to facilitate insertion of the fiber 52 during installation. As depicted, the second portion 142 is larger than the second portion 42 of the ferrule 10 described above. As depicted, the second portion 142 is sized similarly to the tapered portion 432 of the prior art ferrule 400 (see FIG. 29).

The insert 160 includes a central passage 166 that extends from a first end 162 to an opposite end 164 of the insert 160. A first opening 167 is defined where the central passage 166 exits the first end 162, and a second opening 168 is defined where the central passage 166 exits the second end 164. The central passage 166 includes a substantially cylindrical first portion 165 having a second diameter and a second portion 169 (see FIG. 14). The first portion 165 of the insert 160 is sized to receive the fiber 52 including the outer coating 54, sized at 250 microns. The second portion 169 is tapered inward (i.e., funnel shaped) from the opposite end 164 so as to facilitate insertion of the bare fiber 52 and the fiber 52 including the outer coating 54 during installation. The second portion 169 can include a tapered portion 169a that is smoothly transitioned from the first portion 165 (see FIG. 11). The tapered portion 169a can define an angle $\alpha_2$ that is in a range of about 32 degrees to about 38 degrees (see FIG. 14). The second portion 169 can include a cylindrical portion 169b that is smoothly transitioned from the tapered portion 169a. The cylindrical portion 169b can be sized to receive the buffer layer 56 at 900 microns. The second portion 169 can include a tapered portion 169c that is smoothly transitioned from the cylindrical portion 169b. The tapered portion 169c can define a sharp edge at the second end 164 of the insert 160. The second portion 169 can further include additional tapers, cylindrical portions, rounded portions, and other transitioning features as illustrated. The insert 160 includes an exterior taper 170 adjacent the first end 162. A shoulder 172 is adjacent the exterior taper 170 opposite the first end 162 of the insert 160. A flange 174 extends between the shoulder 172 and a tapered shoulder 176. A substantially cylindrical surface 171 extends between the tapered shoulder 176 and the end 164 of the insert 160. The insert 160 is typically polymeric in construction.

The ferrule assembly 108 includes the insert 160 with transitioning features including the cylindrical portion 165 and the funnel portion 169.

As with the ferrule assembly 8, the cylindrical portion 134 of the ferrule 110 closely surrounds the fiber 52, and the cylindrical portion 165 of the insert 160 closely surrounds the coating 54. Epoxy 90 can be used within the central passage 130 to adhesively hold the fiber 52 of the cable 50 to the ferrule 110. In addition, the epoxy 90 can be used within the central passage 166 to adhesively hold the coating 54 of the fiber 52 of the cable 50 to the insert 160, and the epoxy 90 can be used within the central passage 44 of the hub 12 and/or the central passage 166 of the insert 160 to adhesively hold the buffer layer 56 of the cable 50 to the hub 12 and/or the insert 160. As with the ferrule assembly 8, very little epoxy 90 is positioned around the end 55 of the coating 54 providing similar benefits. The second portion 142 of the passage 130 of the ferrule 110 defines a small conically shaped pocket around or near the end 55 of the coating 54. The pocket is a transition area between the bare fiber 52 and the fiber 52 including the outer coating 54. A smaller amount of the epoxy 90 is in contact with the fiber 52 adjacent the end 55 of the coating 54 as with the ferrule assembly 8.

As with the ferrule assembly 8, the coating 54 does not need to be fully inserted into the pocket of the second portion 142 of the passage 130 of the ferrule 110.

In the ferrule 110, the first portion 134 has a dimension sized large enough to receive the uncoated fiber 52, but not so large as to receive the coated fiber. In the insert 160, the first portion 165 has a dimension sized large enough to receive the coated fiber, but not so large as to receive the buffer layer 56.

In the illustrated embodiment, the first portion 134 of the passage 130 of the ferrule 110 is cylindrically shaped and sized at 0.1255 mm +/−0.0015/0.0000 mm to receive the inner fiber 52 sized at 125 microns. The first portion 165 of the central passage 166 of the insert 160 can be cylindrically shaped and sized at 0.260 mm +/−0.010 mm to receive the portion of the cable 50 including the outer coating 54 at 250 microns. A preferred range for the first portion 165 is greater than or equal to 250 microns and less than or equal to 500 microns. A more preferred range for the first portion 165 is greater than or equal to 250 microns and less than or equal to 300 microns. In the illustrated embodiment, the ferrule 10 is 10.5 mm long.

The insert 160 is preferably inserted into the passage 44 of the hub 12 prior to the ferrule 110. In particular, the cylindrical surface 171 of the insert 160 is inserted into the insert retaining surface 19 of the hub 12 until the tapered shoulder 176 of the flange 174 seats against the tapered seat 78 within the passage 44 of the hub 12. Upon the insert 160 being mounted in the hub 12, the ferrule 110 can be inserted into the ferrule mounting surface 14 of the hub 12 until the shoulder 172 of the insert 160 abuts the end 124 of the ferrule 110 and/or until the exterior taper 170 of the insert 160 abuts the second portion 142 of the ferrule 110. The exterior taper 170 of the insert 160 is a protrusion that extends into the second portion 142 of the ferrule 110. The insert 160 and the ferrule 110 can be placed within the passage 44 of the hub 12 together.

Referring now to FIGS. 15-24, a third embodiment of a fiber optic ferrule assembly 208 is illustrated. The ferrule assembly 208 includes a fiber optic ferrule 210 and an insert 260 mounted to a hub 212. Generally, the ferrule 210 and the insert 260 and the hub 212 are secured together by convenient methods including press fit or adhesive mounts. The ferrule 210, the insert 260, and the hub 212 are mounted within the connector housing 13 shown in dashed lines at FIG. 19. The connector housing 13 can be one of a variety of well known connector types, including SC, FC, ST, LX.5, LC, and others. As will be described below, the ferrule 210, the insert 260, and the hub 212 are connected to an end of the fiber optic cable 50 for use in connectorizing the end of the cable 50 (see FIGS. 20 and 21).

The ferrule 210 includes a body 216 with a first end 220 defining a ferrule tip. A distal direction 280 is defined in a direction toward the ferrule tip from other portions of the fiber optic ferrule assembly 208, and a proximal direction 282 is defined in an opposite direction (see FIG. 16). The body 216 of the ferrule 210 includes an opposite end 224 received in a ferrule mounting surface 214 of the hub 212. In the depicted embodiment, the ferrule mounting surface 214 has a form of a cylindrical surface. The ferrule 210 includes a central axis 228 illustrated at FIGS. 16-18. The first end 220 of the ferrule 210 is typically polished along with an end 53 of an optical fiber 52 of the fiber optic cable 50 after the fiber 52 is installed. The body 216 of the ferrule 210 is typically ceramic in construction.

The ferrule 210 includes a central passage 230 concentric with the axis 228. The central passage 230 extends from the first end 220 to the opposite end 224 of the ferrule 210. The central passage 230 includes a substantially cylindrical first portion 234 having a first diameter and a rear or a second portion 242. The first portion 234 is sized to receive the fiber 52, sized at 125 microns. The second portion 242 is tapered inward from the opposite end 224 so as to facilitate insertion of the fiber 52 during installation.

The insert 260 includes a central passage 266, also concentric with the axis 228. The central passage 266 extends from a first end 262 to an opposite end 264 of the insert 260. A first opening 267 is defined where the central passage 266 exits the first end 262, and a second opening 268 is defined where the central passage 266 exits the second end 264. The central passage 266 includes a substantially cylindrical first portion 265 having a second diameter and a second portion 269 (see FIG. 22). The first portion 265 of the insert 260 is sized to receive the fiber 52 including an outer coating 54, sized at 250 microns. The second portion 269 is tapered inward (i.e., funnel shaped) from the opposite end 264 so as to facilitate insertion of the bare fiber 52 and the fiber 52 including the outer coating 54 during installation. The second portion 269 can include a tapered portion 269a that is transitioned from the first portion 265 (see FIG. 22). The tapered portion 269a can define an angle $\alpha_5$ that is in a range of about 6 degrees to about 9 degrees. The second portion 269 can include a tapered portion 269b that is transitioned from the tapered portion 269a. The tapered portion 269b can define an angle $\alpha_3$ that is in a range of about 20 degrees to about 25 degrees. The tapered portion 269b can define a sharp edge at the second end 264 of the insert 260. The tapered portion 269b can be sized to receive the buffer layer 56 at 900 microns (see FIGS. 23 and 24). The second portion 269 can further include additional tapers, cylindrical portions, rounded portions, and other transitioning features. The insert 260 includes a shoulder 272 at the first end 262. A substantially conical surface 271 extends between the shoulder 272 and the end 264 of the insert 260. The conical surface 271 can define an angle $\alpha_8$ that is in a range of about ¾ degree to about 2 degrees (see FIG. 22). The insert 260 is typically polymeric in construction.

Referring now to FIGS. 20-24, the fiber optic cable 50 is shown with the inner fiber 52, the outer coating 54, and the buffer layer 56. The fiber 52 terminates at the end 53. Typically, the end 53 is removed and polished with the end 220 of the ferrule 210. As shown, a portion of the coating 54 extends beyond the end 57 of the buffer layer 56, and a portion of the fiber 52 extends beyond the end 55 of the coating 54.

Figure 23:
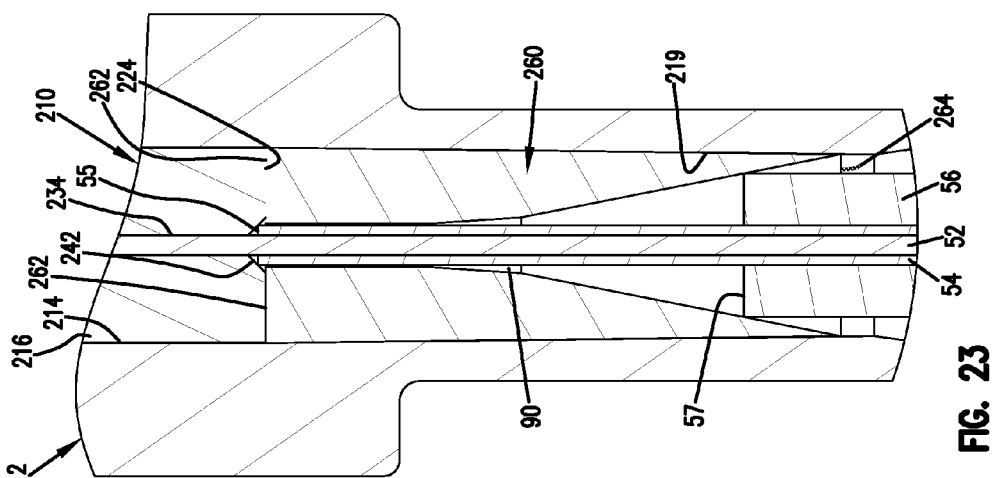
FIG. 23 is an enlarged portion of FIG. 20.
Figure 24:
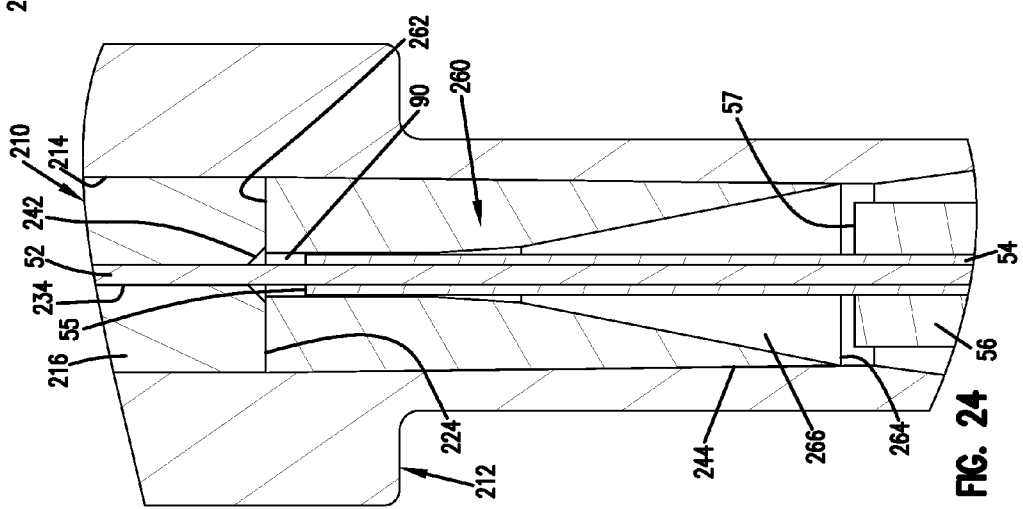
FIG. 24 is an enlarged portion of FIG. 21.
Figure 27:
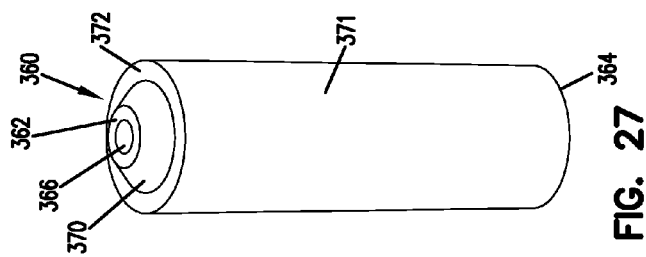
FIG. 27 is a perspective view of the insert of FIG. 25 with the distal end showing.
Figure 28:
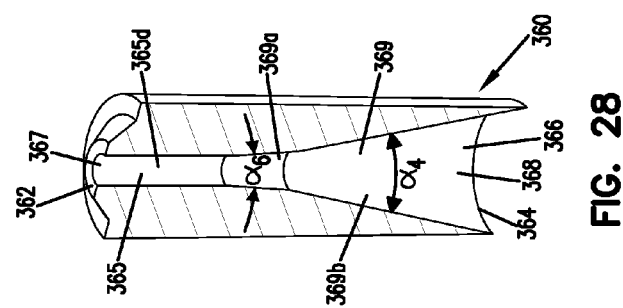
FIG. 28 is the perspective view of FIG. 27 but shown in cross-section.
Figure 25:
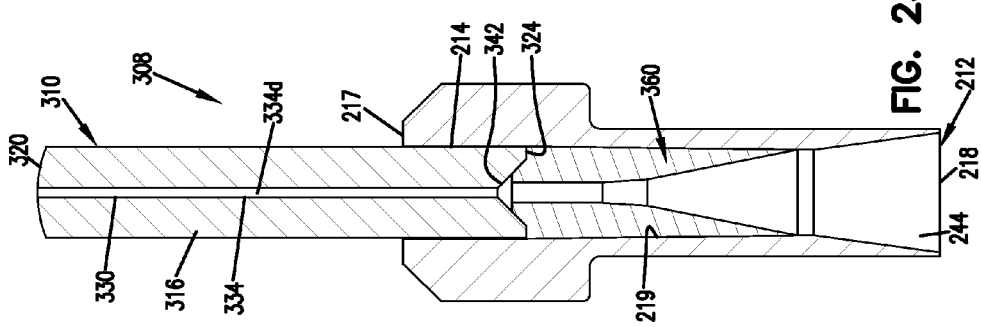
FIG. 25 is a cross-sectional side view of a fourth example embodiment of a ferrule and an insert with the hub of FIG. 15 in accordance with the principles of the present disclosure.
Figure 26:
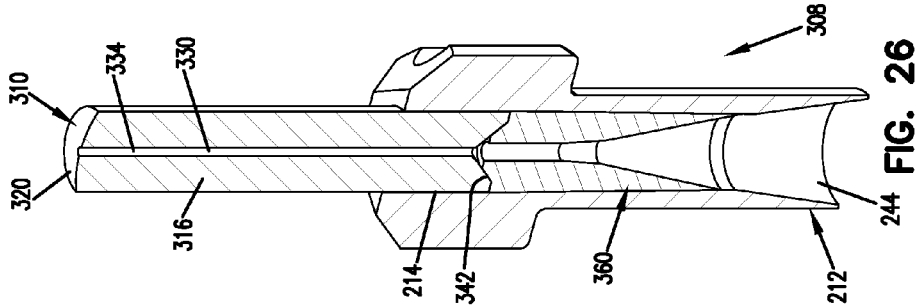
FIG. 26 is a cross-sectional perspective view of the ferrule and the insert of FIG. 25 and the hub of FIG. 15 with the distal end of each showing.

With special reference to FIGS. 23 and 24, the cylindrical portion 234 of the ferrule 210 closely surrounds the fiber 52, and the cylindrical portion 265 of the insert 260 closely surrounds the coating 54. Epoxy 90 can be used within the central passage 230 to adhesively hold the fiber 52 of the cable 50 to the ferrule 210. In addition, the epoxy 90 can be used within the central passage 266 to adhesively hold the coating 54 of the fiber 52 of the cable 50 to the insert 260, and the epoxy 90 can be used within a central passage 244 of the hub 212 and/or the central passage 266 of the insert 260 to adhesively hold the buffer layer 56 of the cable 50 to the hub 212 and/or the insert 260. However, very little epoxy 90 is positioned around the end 55 of the coating 54. By reducing a volume of the epoxy 90 positioned around the end 55 of the coating 54, less thermally induced stresses are applied to the fiber 52. As shown, the second portion 242 of the passage 230 of the ferrule 210 defines a small conically shaped pocket around or near the end 55 of the coating 54. The pocket is a transition area between the bare fiber 52 and the fiber 52 including the outer coating 54. By allowing the coating 54 to extend past the end 57 of the buffer layer 56, and then be received in the pocket of the second portion 242 of the passage 230 of the ferrule 210, a smaller amount of the epoxy 90 is in contact with the fiber 52 adjacent the end 55 of the coating 54. Less epoxy 90 around the interface between the coating 54 and the fiber 52 will reduce the thermal effects caused by any differences in thermal expansion between the fiber 52 and the epoxy 90.

Figure 20:
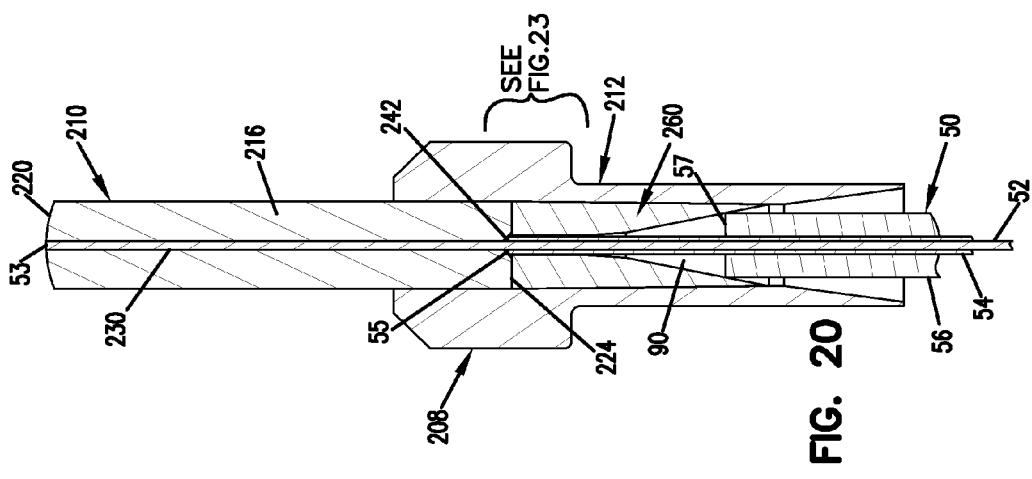
FIG. 20 is the cross-sectional side view of FIG. 19 with a fiber optic cable inserted and a fiber coating layer of the fiber optic cable inserted into the ferrule.
Figure 21:
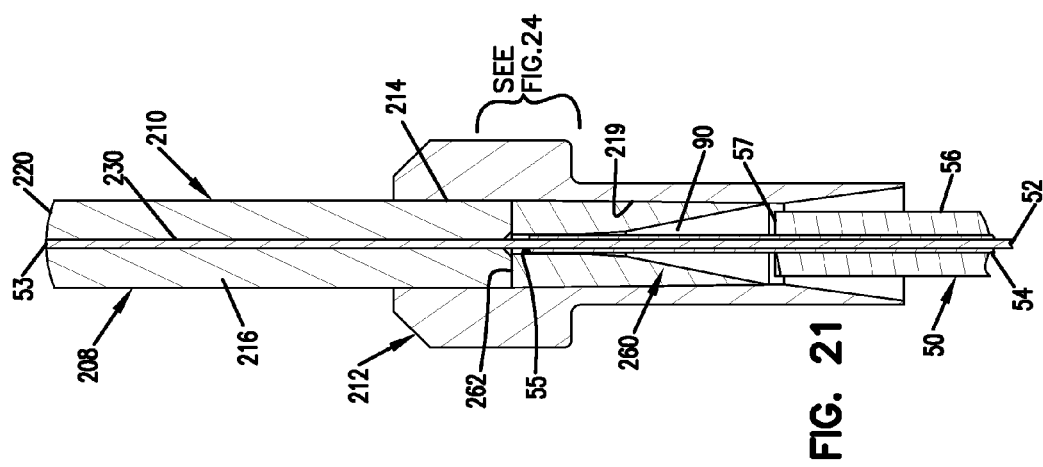
FIG. 21 is the cross-sectional side view of FIG. 19 with the fiber optic cable of FIG. 20 inserted but the fiber coating layer of FIG. 20 not inserted into the ferrule.
Figure 22:
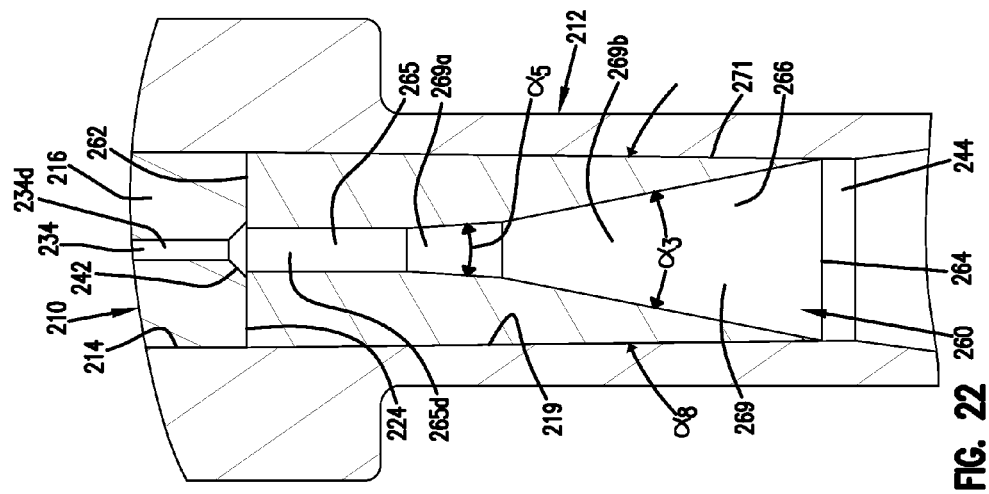
FIG. 22 is an enlarged portion of FIG. 19.

The coating 54 does not need to be fully inserted into the pocket of the second portion 242 of the passage 230 of the ferrule 210, as shown at FIGS. 20 and 23. As shown at FIGS. 21 and 24, the second portion 242 of the passage 230 of the ferrule 210 is spaced from the end 55 of the coating 54. Such an arrangement still provides less epoxy 90 around the fiber 52, than in the arrangement of FIG. 29.

In the ferrule 210, the first portion 234 has a dimension sized large enough to receive the uncoated fiber 52, but not so large as to receive the coated fiber (i.e., the fiber 52 including the coating 54). In the insert 260, the first portion 265 has a dimension sized large enough to receive the coated fiber (i.e., the fiber 52 including the coating 54), but not so large as to receive the buffer layer 56.

In the illustrated embodiment, the first portion 234 of the passage 230 of the ferrule 210 is cylindrically shaped and sized at 0.1255 mm +/−0.0015/0.0000 mm to receive the inner fiber 52 sized at 125 microns. The first portion 265 of the central passage 266 of the insert 260 can be cylindrically shaped and sized at 0.260 mm +/−0.010 mm to receive the portion of the cable 50 including the outer coating 54 at 250 microns. A preferred range for the first portion 65 is greater than or equal to 250 microns and less than or equal to 500 microns. A more preferred range for the first portion 65 is greater than or equal to 250 microns and less than or equal to 300 microns. In the illustrated embodiment, the ferrule 210 is about 6.5 mm long.

The insert 260 is preferably inserted into the passage 244 of the hub 212 prior to the ferrule 210. In particular, the conical surface 271 of the insert 260 is inserted into an insert retaining surface 219 of the hub 212 until the conical surface 271 of the insert 260 seats against a tapered seat 278 of the insert retaining surface 219 within the passage 244 of the hub 212. The insert retaining surface 219 and/or the conical surface 271 can define an angle $\alpha_8$ in a range of about ¾ degree to about 2 degrees (see FIG. 22). Upon the insert 260 being mounted in the hub 212, the ferrule 210 can be inserted into the ferrule mounting surface 214 of the hub 212 until the shoulder 272 of the insert 260 abuts the end 224 of the ferrule 210. The insert 260 and the ferrule 210 can be placed within the passage 244 of the hub 212 together.

In other embodiments, an insert similar to the insert 260 can have a cylindrical outer surface. The cylindrical outer surface of such an insert can be forced into the tapered seat 278 of the insert retaining surface 219 and thereby be deformed into a tapered surface.

In other embodiments, an insert similar to the insert 260 can have a cylindrical outer surface, and the insert retaining surface 219 can include a cylindrical surface in place of the tapered seat 278. The cylindrical outer surface of such an insert can be bonded to the cylindrical surface of the insert retaining surface 219. The cylindrical outer surface of such an insert can be press fit within the cylindrical surface of the insert retaining surface 219 and thereby be deformed into a smaller cylindrical surface.

Friction can be used to hold the insert 260 within the hub 212.

Referring now to FIGS. 25-28, a fourth embodiment of a fiber optic ferrule assembly 308 is illustrated. The ferrule assembly 308 includes a fiber optic ferrule 310 and an insert 360 mounted to the hub 212. The fiber optic ferrule assembly 308 includes similarities to the fiber optic ferrule assembly 208, described above. In particular, the ferrule 310 and the insert 360 and the hub 212 are secured together by convenient methods including press fit or adhesive mounts. The ferrule 310, the insert 360, and the hub 212 are typically mounted within a connector housing, such as the connector housing 13 shown in dashed lines at FIG. 19 and described above. Similar to the ferrule assembly 208, described above, the ferrule 310, the insert 360, and the hub 212 are connected to the end of the fiber optic cable 50 for use in connectorizing the end of the cable 50, similar to the third embodiment of FIGS. 20 and 21.

The ferrule 310 includes a body 316 with a first end 320 defining a ferrule tip. The body 316 of the ferrule 310 includes an opposite end 324 received in the ferrule mounting surface 214 of the hub 212. The first end 320 of the ferrule 310 is typically polished along with the end 53 of the optical fiber 52 of the fiber optic cable 50 after the fiber 52 is installed. The body 316 of the ferrule 310 is typically ceramic in construction.

The ferrule 310 includes a central passage 330 that extends from the first end 320 to the opposite end 324 of the ferrule 310. The central passage 330 includes a substantially cylindrical first portion 334 having a first diameter and a rear or a second portion 342. The first portion 334 is sized to receive the fiber 52, sized at 125 microns. The second portion 342 is tapered inward from the opposite end 324 so as to facilitate insertion of the fiber 52 during installation. As depicted, the second portion 342 is larger than the second portion 242 of the ferrule 210 described above.

The insert 360 includes a central passage 366 that extends from a first end 362 to an opposite end 364 of the insert 360. A first opening 367 is defined where the central passage 366 exits the first end 362, and a second opening 368 is defined where the central passage 366 exits the second end 364. The central passage 366 includes a substantially cylindrical first portion 365 having a second diameter and a second portion 369 (see FIG. 28). The first portion 365 of the insert 360 is sized to receive the fiber 52 including the outer coating 54, sized at 250 microns. The second portion 369 is tapered inward (i.e., funnel shaped) from the opposite end 364 so as to facilitate insertion of the bare fiber 52 and the fiber 52 including the outer coating 54 during installation. The second portion 369 can include a tapered portion 369a that is transitioned from the first portion 365 (see FIG. 28). The tapered portion 369a can define an angle $\alpha_6$ that is in a range of about 6 degrees to about 9 degrees. The second portion 369 can include a tapered portion 369b that is transitioned from the tapered portion 369a. The tapered portion 369b can define an angle $\alpha_4$ that is in a range of about 20 degrees to about 25 degrees. The tapered portion 369b can define a sharp edge at the second end 364 of the insert 360. The tapered portion 369b can be sized to receive the buffer layer 56 at 900 microns. The second portion 369 can further include additional tapers, cylindrical portions, rounded portions, and other transitioning features. The insert 360 includes an exterior taper 370 adjacent the first end 362. A shoulder 372 is adjacent the exterior taper 370 opposite the first end 362 of the insert 360. A substantially conical surface 371 extends between the shoulder 372 and the end 364 of the insert 360. The conical surface 371 can define the angle $\alpha_8$, as mentioned above and illustrated at FIG. 22. The insert 360 is typically polymeric in construction.

The ferrule assembly 308 includes the insert 360 with transitioning features including the cylindrical portion 365 and the funnel/tapered portion 369. As with the ferrule assembly 208, the cylindrical portion 334 of the ferrule 310 closely surrounds the fiber 52, and the cylindrical portion 365 of the insert 360 closely surrounds the coating 54. Epoxy 90 can be used within the central passage 330 to adhesively hold the fiber 52 of the cable 50 to the ferrule 310. In addition, the epoxy 90 can be used within the central passage 366 to adhesively hold the coating 54 of the fiber 52 of the cable 50 to the insert 360, and the epoxy 90 can be used within the central passage 244 of the hub 212 and/or the central passage 366 of the insert 360 to adhesively hold the buffer layer 56 of the cable 50 to the hub 212 and/or the insert 360. As with the ferrule assembly 208, very little epoxy 90 is positioned around the end 55 of the coating 54 providing similar benefits. The second portion 342 of the passage 330 of the ferrule 310 defines a small conically shaped pocket around or near the end 55 of the coating 54. The pocket is a transition area between the bare fiber 52 and the fiber 52 including the outer coating 54. A smaller amount of the epoxy 90 is in contact with the fiber 52 adjacent the end 55 of the coating 54 as with the ferrule assembly 208.

As with the ferrule assembly 208, the coating 54 does not need to be fully inserted into the pocket of the second portion 342 of the passage 330 of the ferrule 310.

In the ferrule 310, the first portion 334 has a dimension sized large enough to receive the uncoated fiber 52, but not so large as to receive the coated fiber. In the insert 360, the first portion 365 has a dimension sized large enough to receive the coated fiber, but not so large as to receive the buffer layer 56.

In the illustrated embodiment, the first portion 334 of the passage 330 of the ferrule 310 is cylindrically shaped and sized at 0.1255 mm +/−0.0015/0.0000 mm to receive the inner fiber 52 sized at 125 microns. The first portion 365 of the central passage 366 of the insert 360 can be cylindrically shaped and sized at 0.260 mm +/−0.010 mm to receive the portion of the cable 50 including the outer coating 54 at 250 microns. A preferred range for the first portion 365 is greater than or equal to 250 microns and less than or equal to 500 microns. A more preferred range for the first portion 365 is greater than or equal to 250 microns and less than or equal to 300 microns. In the illustrated embodiment, the ferrule 310 is about 6.5 mm long.

The insert 360 is preferably inserted into the passage 244 of the hub 212 prior to the ferrule 310. In particular, the conical surface 371 of the insert 360 is inserted into an insert retaining surface 219 of the hub 212 until the conical surface 371 of the insert 360 seats against a tapered seat 278 of the insert retaining surface 219 within the passage 244 of the hub 212. The insert retaining surface 219 and/or the conical surface 371 can define the angle $\alpha_8$, as described above and illustrated at FIG. 22. Upon the insert 360 being mounted in the hub 212, the ferrule 310 can be inserted into the ferrule mounting surface 214 of the hub 212 until the shoulder 372 of the insert 360 abuts the end 324 of the ferrule 310 and/or until the exterior taper 370 of the insert 360 abuts the second portion 342 of the ferrule 310. The exterior taper 370 of the insert 360 is a protrusion that extends into the second portion 342 of the ferrule 310. The insert 360 and the ferrule 310 can be placed within the passage 244 of the hub 212 together.

The present disclosure also pertains to a method of assembling a ferrule terminated fiber optic cable that includes providing the ferrule 10, 110, 210, 310; the hub 12, 212; and the insert 60, 160, 260, 360 and inserting the insert 60, 160, 260, 360 and a portion of the ferrule 10, 110, 210, 310 into the axial passage 44, 244 of the hub 12, 212. The end 24, 124, 224, 324 of the ferrule 10, 110, 210, 310 is inserted into the axial passage 44, 244 of the hub 12, 212. The axial passage 30, 130, 230, 330 of the ferrule 10, 110, 210, 310 includes the tapered shape 42, 142, 242, 342 adjacent the end 24, 124, 224, 324 of the ferrule 10, 110, 210, 310 tapering down to a first inner diameter 34d, 134d, 234d, 334d. The method includes providing the cable 50 with the inner fiber 52 at 125 microns, the outer coating 54 at 250 microns around the inner fiber 52, and the buffer layer 56 at 900 microns around the outer coating 54. The method includes stripping a stripped portion of the buffer layer 56 from an end of the cable 50 to expose an exposed portion of the outer coating 54 and create a new end of the buffer layer 56, stripping a stripped portion of the exposed portion of the outer coating 54 from the end of the cable 50 to expose an exposed portion of the inner fiber 52 with a remaining exposed portion of the outer coating 54 remaining on the cable 50. The method further includes inserting the exposed portion of the inner fiber 52 into the axial passage 30, 130, 230, 330 of the ferrule 10, 110, 210, 310 and the remaining exposed portion of the outer coating 54 into the axial passage 66, 166, 266, 366 of the insert 60, 160, 260, 360 with the axial passage 30, 130, 230, 330 of the ferrule 10, 110, 210, 310 having the first inner diameter 34d, 134d, 234d, 334d and the axial passage 66, 166, 266, 366 of the insert 60, 160, 260, 360 having a second inner diameter 65d, 165d, 265d, 365d. The first inner diameter 34d, 134d, 234d, 334d only receives the inner fiber 52 and no outer coating 54. The second inner diameter 65d, 165d, 265d, 365d receives at least a portion of the remaining exposed portion of the outer coating 54 and no buffer layer 56. The new end of the buffer layer 56 is positioned in the axial passage 44, 244 of the hub 12, 212. The first inner diameter 34d, 134d, 234d, 334d is at least 125 microns, and the second inner diameter 65d, 165d, 265d, 365d is at least 250 microns. The method can further include adhesively holding the inner fiber 52 to the ferrule 10, 110, 210, 310.

Other aspects of the present disclosure include the insert 60, 160, 260, 360 forming a seal between the ferrule 10, 110, 210, 310 and the hub 12, 212. In particular, the insert 60, 160, 260, 360 can be made of a softer material (e.g. a plastic, a polymer, a rubber, etc.) than the ferrule 10, 110, 210, 310 and the hub 12, 212. The hub 12, 212 can be made of a metal, and the ferrule 10, 110, 210, 310 can be made of a metal or a ceramic. The insert 60, 160, 260, 360 can therefore deform/conform to the hub 12, 212 and/or the ferrule 10, 110, 210, 310 when the fiber optic ferrule assembly 8, 108, 208, 308 is assembled. The insert 60, 160, 260, 360 can be injection molded and trapped within the hub 12, 212 upon assembly. The insert 60, 160, 260, 360 can be directly injection molded into the hub 12, 212. The insert 60, 160, 260, 360 can reduce the complexity of the hub 12, 212 (e.g., compare the hub 12 of FIG. 5 to the prior art hub 412 of FIG. 29).

The insert 60, 160, 260, 360 is illustrated as being inserted into a distal end 17, 217 of the hub 12, 212 in the proximal direction 82, 282 (see FIGS. 2, 4, 16, and 18). In other embodiments, the insert 60, 160, 260, 360 can be inserted into a proximal end 18, 218 of the hub 12, 212 in the distal direction 80, 280 (see FIGS. 2 and 16).

By reducing the volume of the epoxy 90 used in the fiber optic ferrule assembly 8, 108, 208, 308, the insert 60, 160, 260, 360 also reduces a potential for voids in the epoxy 90 within the fiber optic ferrule assembly 8, 108, 208, 308. By reducing the volume of the epoxy 90 used in the fiber optic ferrule assembly 8, 108, 208, 308, the insert 60, 160, 260, 360 also streamlines a path the epoxy 90 follows when it is injected into the fiber optic ferrule assembly 8, 108, 208, 308.

Certain benefits of certain embodiments of the present disclosure include easy termination of a fiber optic cable 50 with a fiber optic connector, a reliable fiber optic connector, a strong fiber optic connector, and/or low cost termination of a fiber optic cable 50 with a fiber optic connector. Particular examples of how some or all of the above goals are achieved are described below.

Fiber optic connectors with ceramic ferrules 400 mounted in metal hubs 412 are known in the art. Such fiber optic connectors typically offer high strength including high strength at a joint connecting the ceramic ferrule 400 to the metal hub 412. However, a passageway that holds an optical fiber 52 within the ferrule 400 and hub 412 typically includes internal transitions that result in excess epoxy 90 and/or voids adjacent the optical fiber 52 when the fiber optic connector terminates a fiber optic cable 50. By including an insert 60, 160, 260, 360 within the hub 12, 212, the present disclosure can optimally shape the passageway 66, 166, 266, 366, including internal transitions, holding the optical fiber 52. Such an optimized passageway 66, 166, 266, 366 can minimize epoxy 90 adjacent the optical fiber 52 and reduce or eliminate voids within the optimized passageway 66, 166, 266, 366. Because the insert 60, 160, 260, 360 is molded (e.g., of plastic), a complex shape can be defined for the optimized passageway 66, 166, 266, 366 without substantially increasing the cost. In contrast, machining complex shapes into the metal hub 412 and/or the ceramic ferrule 400 can significantly increase cost. Furthermore, machining complex internal shapes in the metal hub 412 can result in burrs. Checking for burrs and/or removing the burrs from the metal hub 412 can further increase cost. Allowing burrs into a finished fiber optic connector can result in the optical fiber 52 failing from the burrs (e.g., by becoming scratched). The insert 60, 160, 260, 360 does not need to be strong as strength requirements of the fiber optic connector are met by the metal hub 12, 212, the ceramic ferrule 10, 110, 210, 310, and the joint connecting the metal hub 12, 212 to the ceramic ferrule 10, 110, 210, 310. By including an insert 60, 160, 260, 360 in the metal hub 12, 212, the strength of the metal hub 12, 212 can be enjoyed along with low-cost complex features of the insert 60, 160, 260, 360.

Figure 19:
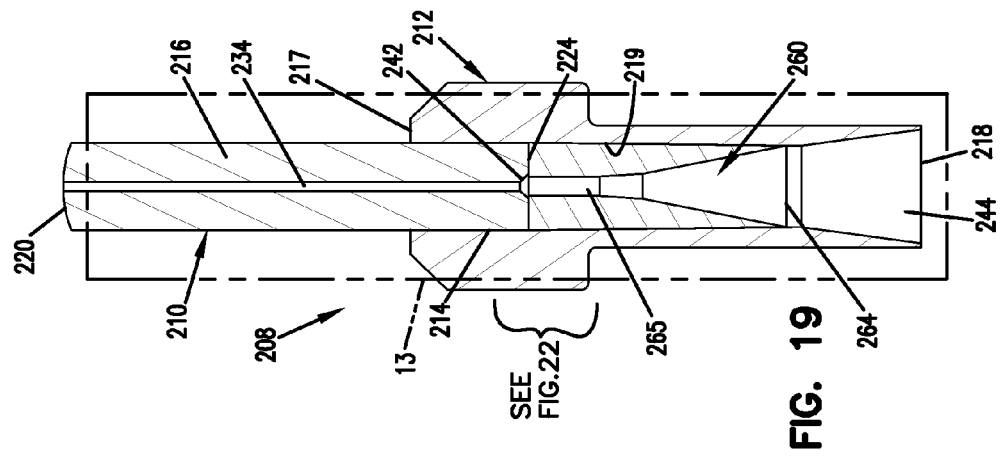
FIG. 19 is a cross-sectional side view of the ferrule, the insert, and the hub of FIG. 15.

The insert 60, 260 of the fiber optic connector of the present disclosure can include an internal passageway 66, 266 that allows for a smaller funnel 42, 242 in the passageway 30, 230 of the ferrule 10, 210. The funnels 42, 242, illustrated at FIGS. 5 and 19 are smaller in comparison to the funnel 432, illustrated at FIG. 29. The smaller funnel 42, 242 of the passageway 30, 230 of the ferrule 10, 210 can significantly lower the cost to produce the ferrule 10, 210 and provide smoother internal transitions between the ferrule 10, 210 and the insert 60, 260. The insert 60, 260 of the fiber optic connector of the present disclosure can include an internal passageway 66, 266 that allows for easy insertion of the optical fiber 52 and/or epoxy 90. The insert 60, 260 of the fiber optic connector of the present disclosure can include an internal passageway 66, 266 that allows for close proximity to the optical fiber 52 and/or the outer coating 54 of the optical fiber 52.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A fiber optic terminal comprising:
a ferrule extending from a proximal end to an opposite distal end, the ferrule including an axial passage extending between the proximal end and the distal end of the ferrule, the axial passage of the ferrule defining a tapered shape at the proximal end of the ferrule, and the tapered shape of the axial passage of the ferrule extending inwardly from the proximal end of the ferrule to a diametral portion of the axial passage of the ferrule;
a hub extending from a proximal end to an opposite distal end, the hub including an axial passage extending between the proximal end and the distal end of the hub, the axial passage of the hub defining a ferrule mounting surface between the proximal end and the distal end of the hub, and the axial passage of the hub defining an insert retaining surface between the ferrule mounting surface and the proximal end of the hub; and
an insert extending from a proximal end to an opposite distal end, the insert retained by the insert retaining surface of the hub and by contact with the proximal end of the ferrule, the insert including an axial passage extending between the proximal end and the distal end of the insert, the axial passage of the insert defining a proximal opening at the proximal end of the insert and a distal opening at the distal end of the insert, the axial passage of the insert defining a tapered shape extending and narrowing from a proximal end to a distal end, the tapered shape of the axial passage of the insert defining an acute angle across an interior of the tapered shape of the axial passage of the insert.

2. The fiber optic terminal of claim 1, wherein the distal end of the insert is positioned within the tapered shape of the axial passage of the ferrule.

3. The fiber optic terminal of claim 1, wherein the distal end of the insert abuts the proximal end of the ferrule.

4. The fiber optic terminal of claim 2, wherein the insert includes an exterior taper with a distal end, the distal end of the exterior taper is positioned at the distal end of the insert, and the exterior taper of the insert is mated with the tapered shape of the axial passage of the ferrule.

5. The fiber optic terminal of claim 1, wherein the insert retaining surface of the axial passage of the hub includes a tapered seat and the insert includes an exterior taper that mounts within the tapered seat of the axial passage of the hub.

6. The fiber optic terminal of claim 1, wherein the insert retaining surface of the axial passage of the hub includes a tapered seat and an interior cylindrical surface adjacent the tapered seat, wherein the insert includes an exterior taper that seats against the tapered seat of the axial passage of the hub, and wherein the insert includes an exterior cylindrical surface that mounts within the interior cylindrical surface of the axial passage of the hub.

7. The fiber optic terminal of claim 5, wherein the tapered seat of the axial passage of the hub increases in size in a distal direction.

8. The fiber optic terminal of claim 6, wherein the tapered seat of the axial passage of the hub increases in size in a distal direction and the interior cylindrical surface of the axial passage of the hub is positioned between the tapered seat of the axial passage of the hub and the proximal end of the hub.

9. The fiber optic terminal of claim 1, wherein the ferrule is a ceramic ferrule, the hub is a metal hub, and the insert is a plastic insert.

10. The fiber optic terminal of claim 1, wherein the ferrule is a ceramic ferrule, the hub is a metal hub, and the insert is a plastic insert formed by injection molding.

11. The fiber optic terminal of claim 1, wherein the hub is a metal hub and the insert is a plastic insert formed by injection molding plastic material directly into the hub.

12. The fiber optic terminal of claim 1, wherein the diametral portion of the axial passage of the ferrule defines a diameter of at least 125 microns for receiving a 125 micron uncoated end fiber portion of a coated fiber of an optical fiber cable.

13. The fiber optic terminal of claim 12, wherein a diametral portion of the axial passage of the insert defines a diameter of at least 250 microns for receiving a 250 micron coating around the coated fiber of the optical fiber cable, the diametral portion of the axial passage of the insert positioned between the distal opening and the tapered shape of the axial passage of the insert.

14. The fiber optic terminal of claim 1, wherein the contact with the proximal end of the ferrule extends at least partially around an axis defined by the axial passage of the ferrule.

15. The fiber optic terminal of claim 1, wherein the contact with the proximal end of the ferrule extends circumferentially around an axis defined by the axial passage of the ferrule.

16. A fiber optic terminal comprising:
a ferrule extending from a proximal end to an opposite distal end, the ferrule including an axial passage extending between the proximal end and the distal end of the ferrule, the axial passage of the ferrule defining a tapered shape at the proximal end of the ferrule, and the tapered shape of the axial passage of the ferrule extending inwardly from the proximal end of the ferrule to a diametral portion of the axial passage of the ferrule;
a hub extending from a proximal end to an opposite distal end, the hub including an axial passage extending between the proximal end and the distal end of the hub, the axial passage of the hub defining a ferrule mounting surface between the proximal end and the distal end of the hub, and the axial passage of the hub defining an insert retaining surface between the ferrule mounting surface and the proximal end of the hub; and
an insert extending from a proximal end to an opposite distal end, the insert retained by the insert retaining surface of the hub and positioned adjacent to the proximal end of the ferrule, the insert including an axial passage extending between the proximal end and the distal end of the insert, the axial passage of the insert defining a proximal opening at the proximal end of the insert and a distal opening at the distal end of the insert, the axial passage of the insert defining a tapered shape extending and narrowing from a proximal end to a distal end, the tapered shape of the axial passage of the insert defining an acute angle across an interior of the tapered shape of the axial passage of the insert;
wherein the distal end of the insert is positioned within the tapered shape of the axial passage of the ferrule;
wherein the insert includes an exterior taper with a distal end, the distal end of the exterior taper is positioned at the distal end of the insert, and the exterior taper of the insert is mated with the tapered shape of the axial passage of the ferrule; and
wherein the insert includes a shoulder adjacent the exterior taper and spaced from the distal end of the exterior taper and wherein the shoulder of the insert abuts the proximal end of the ferrule.

17. The fiber optic terminal of claim 16, wherein the shoulder of the insert defines a distal end of a flange, a proximal end of the flange of the insert defines a tapered shoulder, and the tapered shoulder of the insert seats against a tapered seat within the axial passage of the hub.

18. A fiber optic terminal comprising:
a ferrule extending from a proximal end to an opposite distal end, the ferrule including an axial passage extending between the proximal end and the distal end of the ferrule, the axial passage of the ferrule defining a tapered shape at the proximal end of the ferrule, and the tapered shape of the axial passage of the ferrule extending inwardly from the proximal end of the ferrule to a diametral portion of the axial passage of the ferrule;
a hub extending from a proximal end to an opposite distal end, the hub including an axial passage extending between the proximal end and the distal end of the hub, the axial passage of the hub defining a ferrule mounting surface between the proximal end and the distal end of the hub, and the axial passage of the hub defining an insert retaining surface between the ferrule mounting surface and the proximal end of the hub; and
an insert extending from a proximal end to an opposite distal end, the insert retained by the insert retaining surface of the hub and positioned adjacent to the proximal end of the ferrule, the insert including an axial passage extending between the proximal end and the distal end of the insert, the axial passage of the insert defining a proximal opening at the proximal end of the insert and a distal opening at the distal end of the insert, the axial passage of the insert defining a tapered shape extending and narrowing from a proximal end to a distal end, the tapered shape of the axial passage of the insert defining an acute angle across an interior of the tapered shape of the axial passage of the insert;
wherein the distal end of the insert abuts the proximal end of the ferrule; and
wherein the distal end of the insert defines a distal end of a flange, a proximal end of the flange of the insert defines a tapered shoulder, and the tapered shoulder of the insert seats against a tapered seat within the axial passage of the hub.

19. A fiber optic terminal comprising:
a ferrule extending from a proximal end to an opposite distal end, the ferrule including an axial passage extending between the proximal end and the distal end of the ferrule, the axial passage of the ferrule defining a tapered shape at the proximal end of the ferrule, and the tapered shape of the axial passage of the ferrule extending inwardly from the proximal end of the ferrule to a diametral portion of the axial passage of the ferrule;
a hub extending from a proximal end to an opposite distal end, the hub including an axial passage extending between the proximal end and the distal end of the hub, the axial passage of the hub defining a ferrule mounting surface between the proximal end and the distal end of the hub, and the axial passage of the hub defining an insert retaining surface between the ferrule mounting surface and the proximal end of the hub; and an insert extending from a proximal end to an opposite distal end, the insert retained by the insert retaining surface of the hub and positioned adjacent to the proximal end of the ferrule, the insert including an axial passage extending between the proximal end and the distal end of the insert, the axial passage of the insert defining a proximal opening at the proximal end of the insert and a distal opening at the distal end of the insert, the axial passage of the insert defining a tapered shape extending and narrowing from a proximal end to a distal end, the tapered shape of the axial passage of the insert defining an acute angle across an interior of the tapered shape of the axial passage of the insert;

wherein the insert retaining surface of the axial passage of the hub is a cylindrical surface, the insert includes a flange, and the axial passage of the hub includes a shoulder positioned between the ferrule mounting surface and the insert retaining surface and wherein the flange of the insert is retained between the shoulder of the axial passage of the hub and the proximal end of the ferrule.

20. The fiber optic terminal of claim 19, wherein the flange of the insert is positioned at the distal end of the insert.

21. The fiber optic terminal of claim 19, wherein the insert includes an exterior taper with a distal end, the distal end of the exterior taper is positioned at the distal end of the insert, the exterior taper of the insert is mated with the tapered shape of the axial passage of the ferrule and wherein the flange of the insert is positioned between the exterior taper of the insert and the insert retaining surface of the hub.

22. A method of assembling a ferrule terminated cable comprising:

providing a ferrule, a hub, and an insert, wherein the insert is inserted into an axial passage of the hub and a portion of the ferrule is inserted into the axial passage of the hub;

providing a cable with an inner fiber, an outer coating around the inner fiber, and a buffer layer around the outer coating;

stripping a stripped portion of the buffer layer from an end of the cable to expose an exposed portion of the outer coating and create a new end of the buffer layer;

stripping a stripped portion of the exposed portion of the outer coating from the end of the cable to expose an exposed portion of the inner fiber, a remaining exposed portion of the outer coating remaining on the cable;

inserting the exposed portion of the inner fiber into an axial passage of the ferrule and the remaining exposed portion of the outer coating into an axial passage of the insert, the axial passage of the ferrule having a first inner diameter and the axial passage of the insert having a second inner diameter, wherein the first inner diameter only receives the inner fiber and no outer coating, the second inner diameter receives at least a portion of the remaining exposed portion of the outer coating and no buffer layer, an end of the ferrule is inserted into the axial passage of the hub, the axial passage of the ferrule includes a tapered shape adjacent the end of the ferrule tapering down to the first inner diameter, and the new end of the buffer layer is positioned in the axial passage of the hub.

23. The method of claim 22, further comprising adhesively holding the exposed portion of the inner fiber to the axial passage of the ferrule.

24. The method of claim 22, wherein epoxy is used within the axial passage of the ferrule to adhesively hold the exposed portion of the inner fiber to the axial passage of the ferrule.

25. The method of claim 22, wherein the ferrule is adhesively mounted to the hub.

26. The method of claim 22, wherein the ferrule is press fit mounted to the hub.

27. The method of claim 22, wherein the ferrule and the insert are both inserted into the axial passage of the hub from a same end of the hub.

28. The method of claim 22, further comprising retaining the insert with the end of the ferrule by contact with the end of the ferrule, the contact extending at least partially around an axis defined by the axial passage of the ferrule.

29. The method of claim 22, further comprising retaining the insert with the end of the ferrule by contact with the end of the ferrule, the contact extending circumferentially around an axis defined by the axial passage of the ferrule.

* * * * *